Patented Oct. 31, 1933

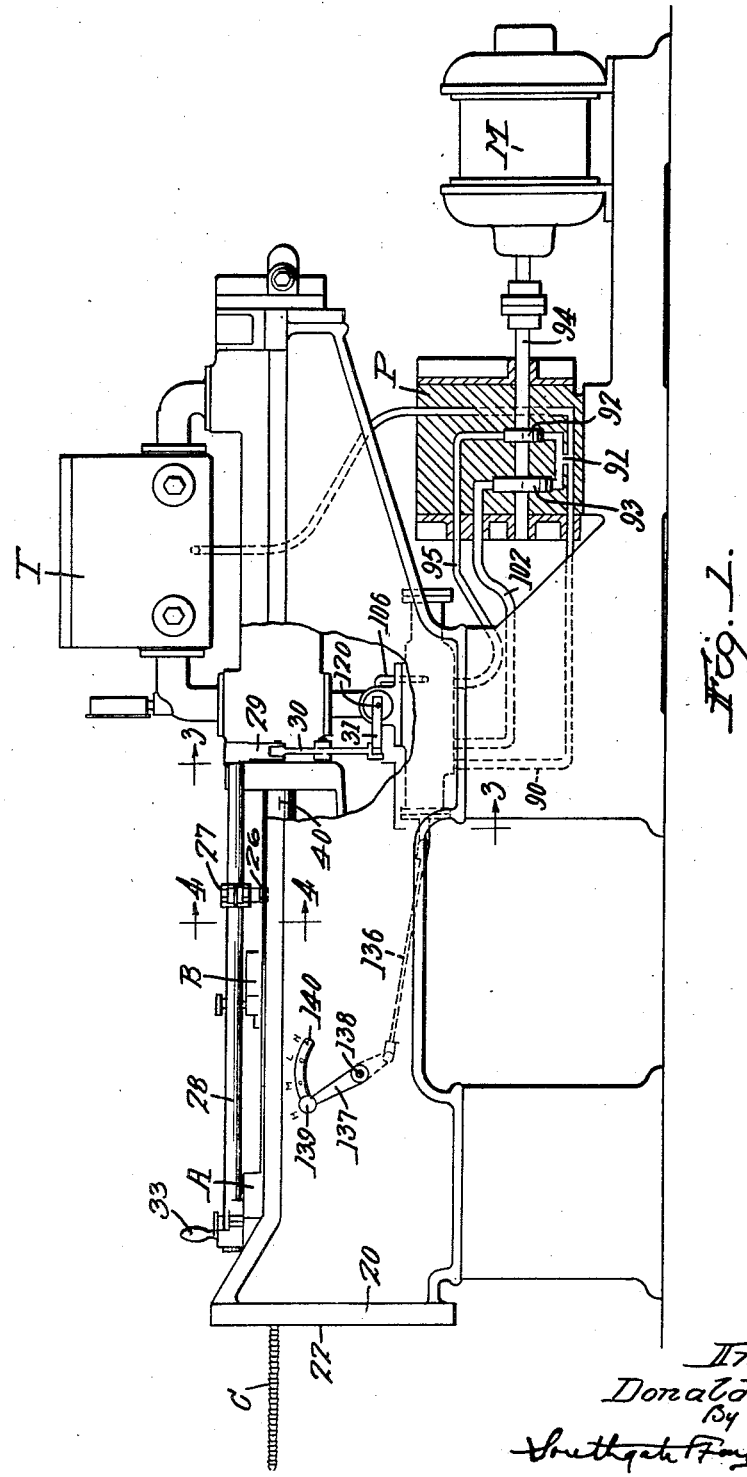

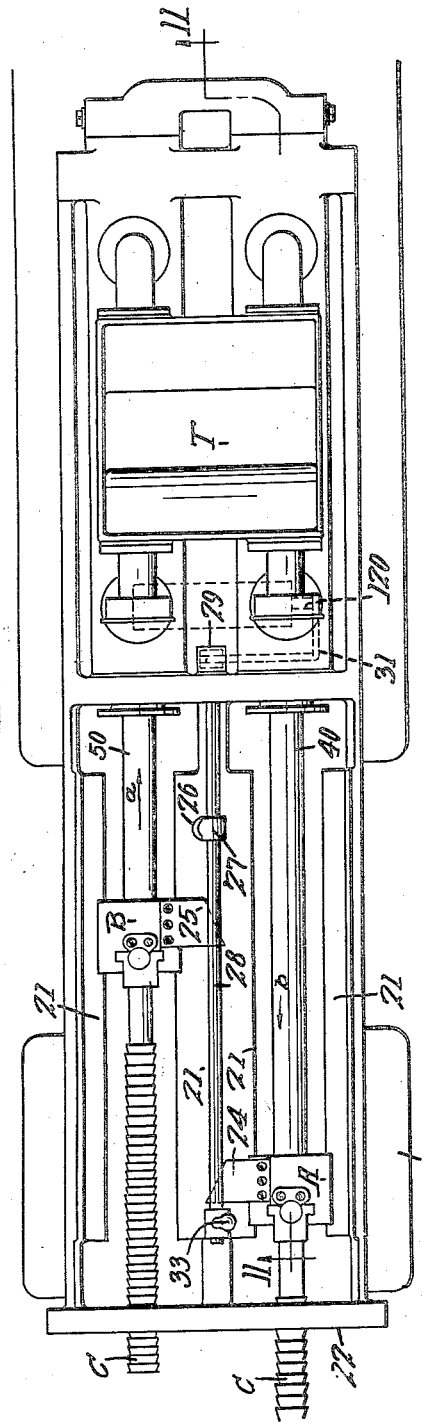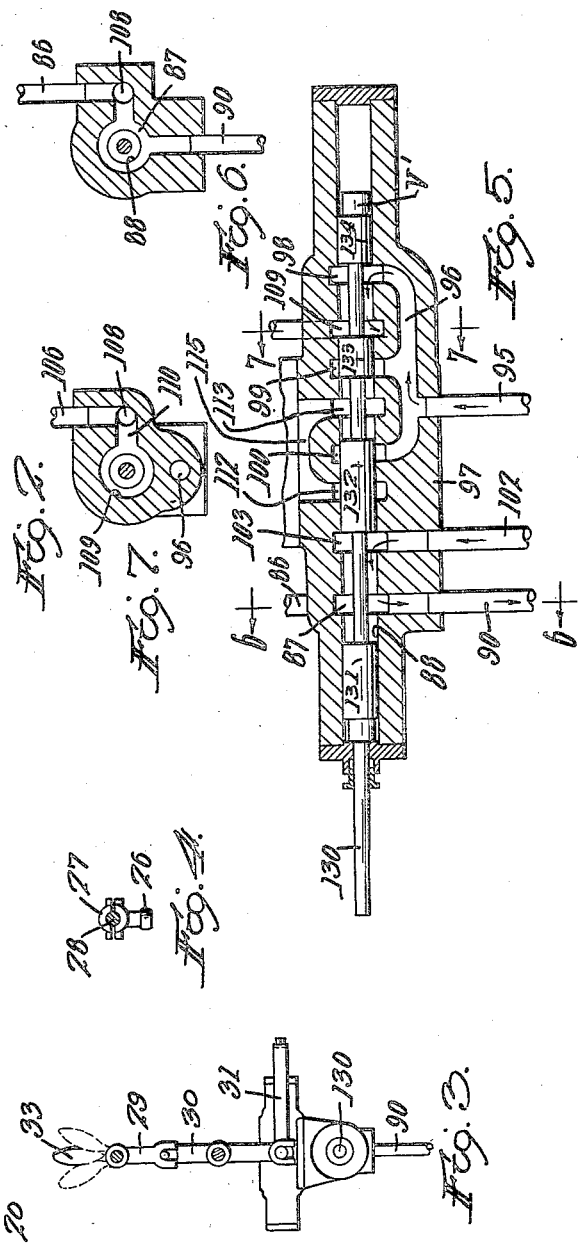

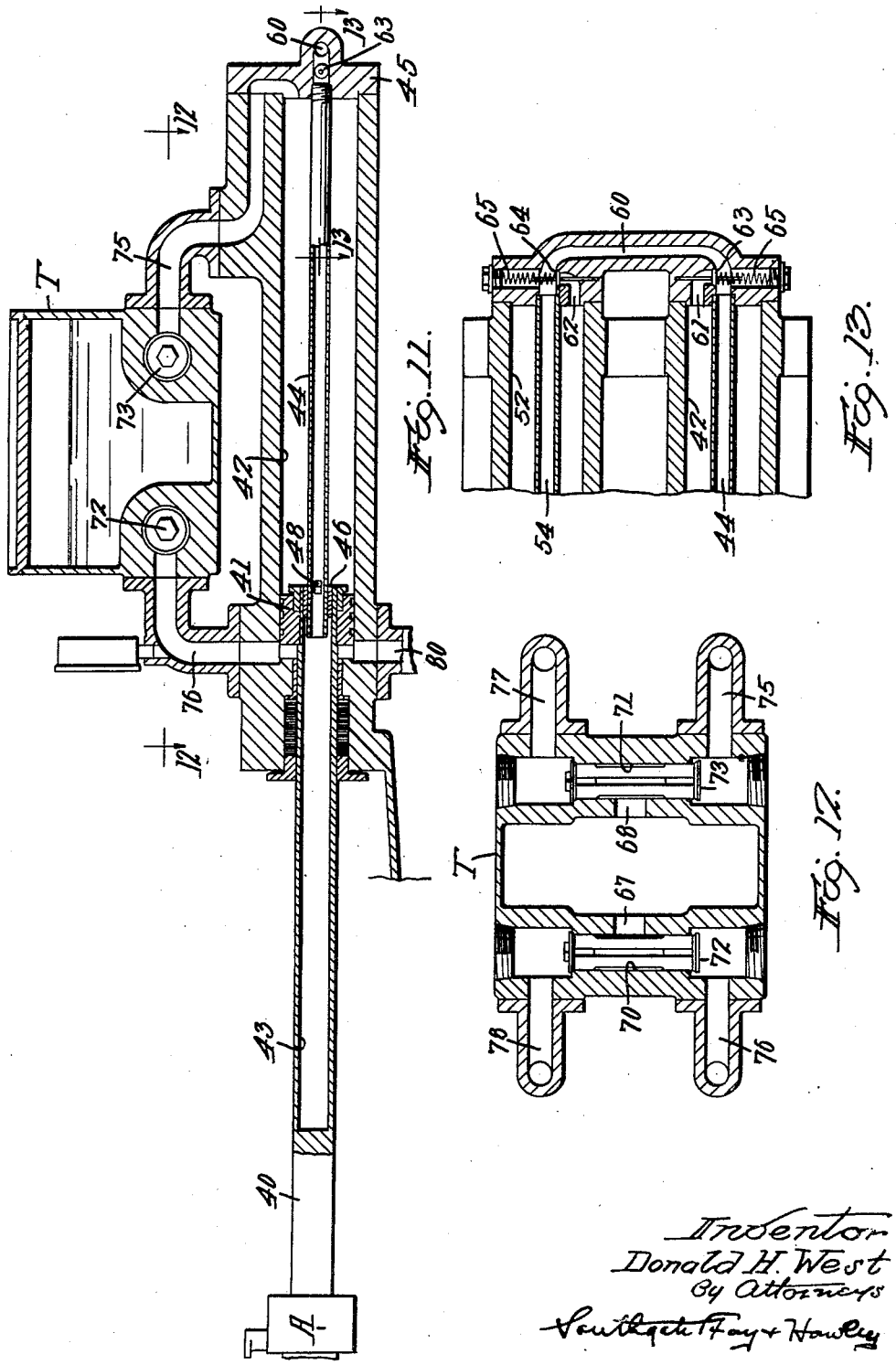

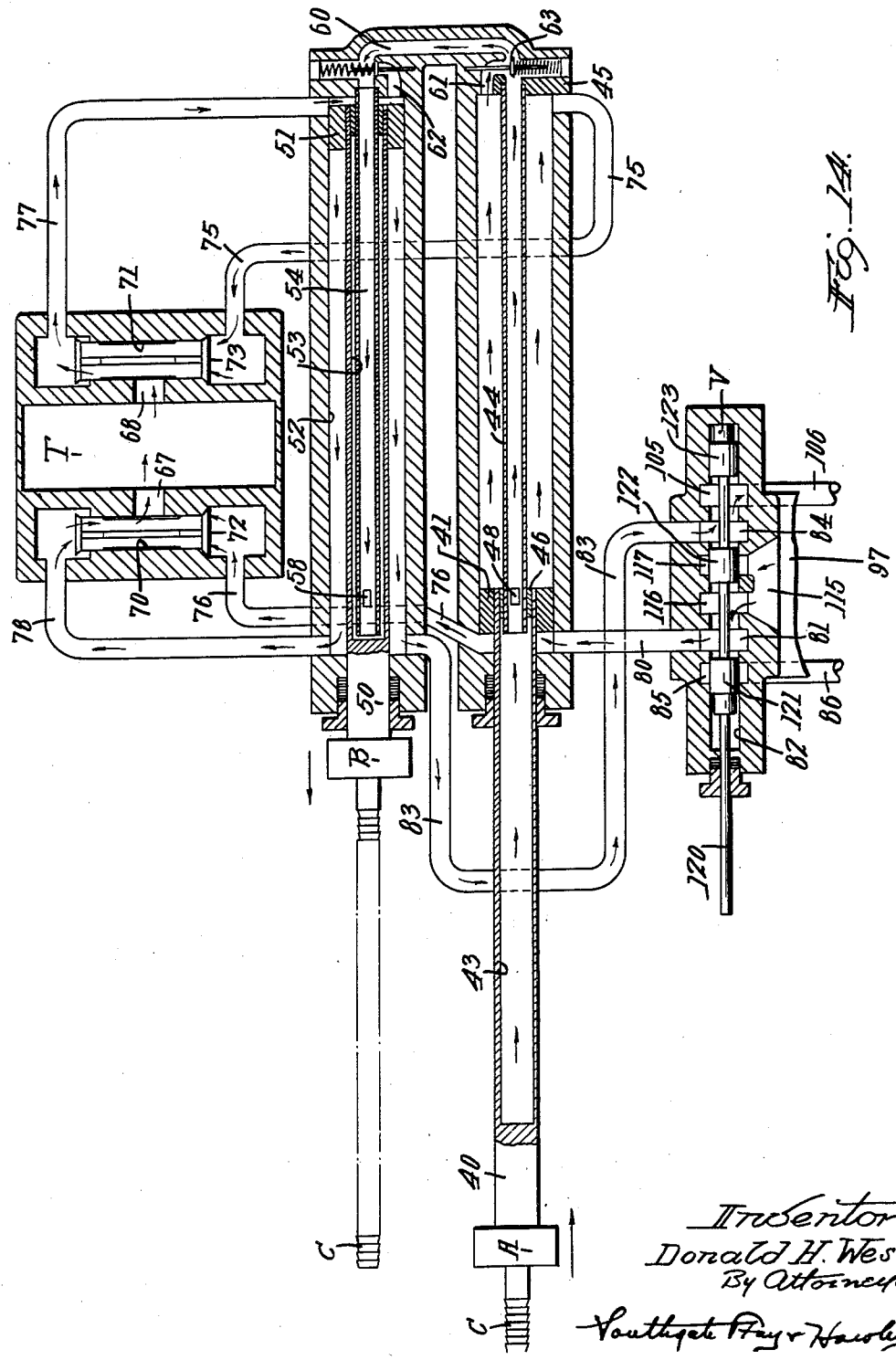

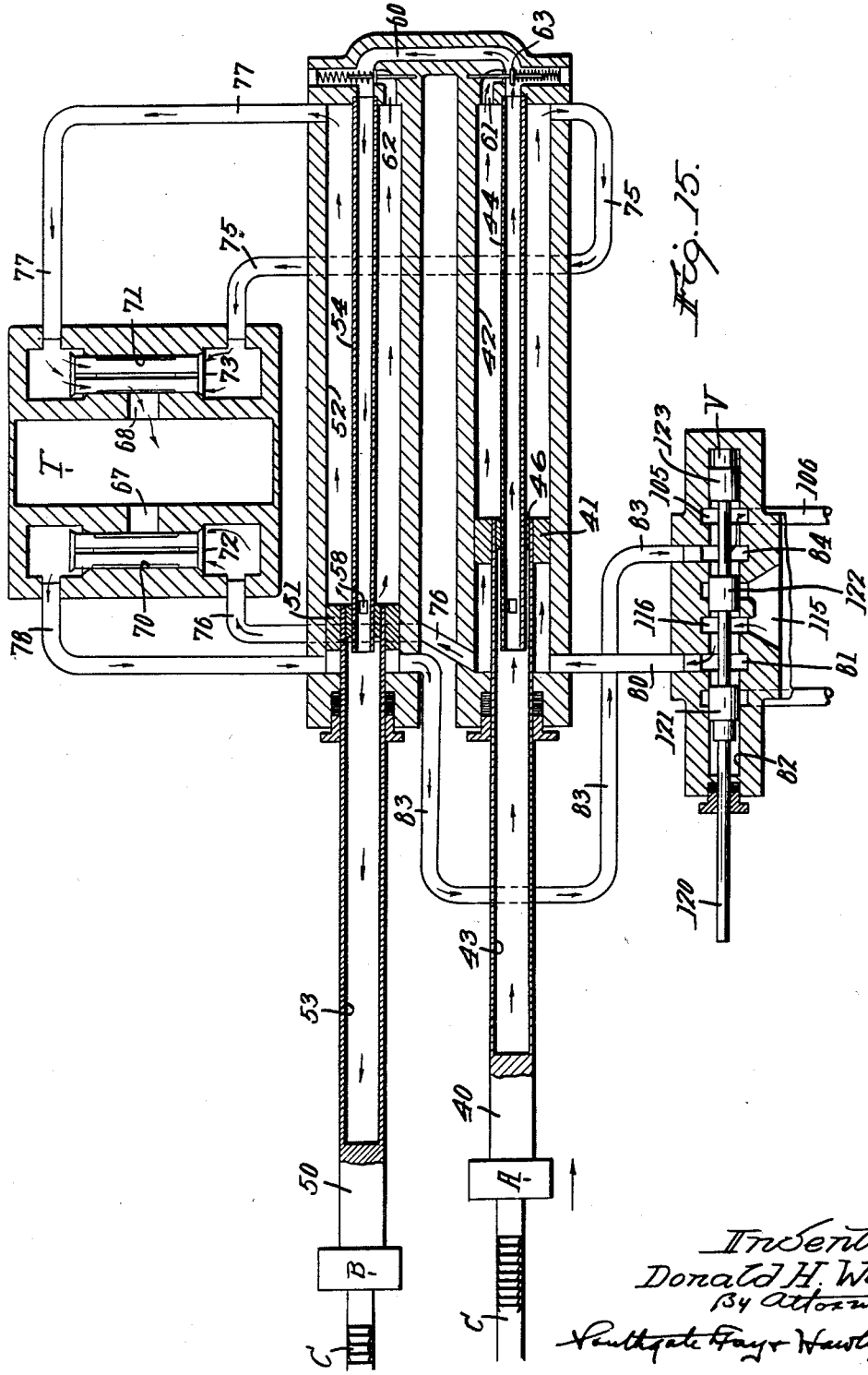

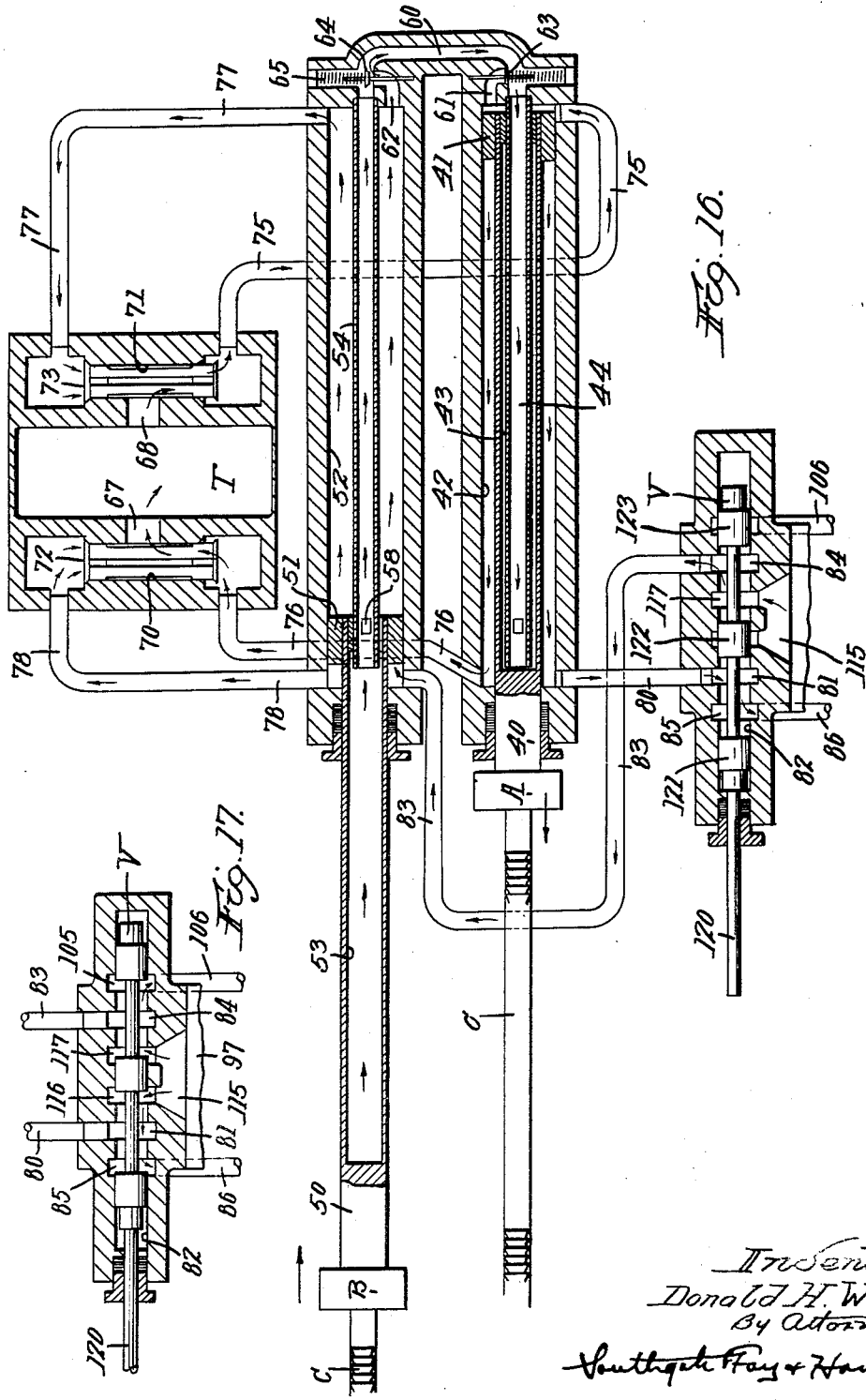

1,932,761

UNITED STATES PATENT OFFICE 1,932,761

DUPLEX HYDRAULIC BROACHING MACHINE

Donald H. West, Marlboro, Mass., assignor to The Lapointe Machine Tool Company, Hudson, Mass., a corporation of Maine Application May 19, 1931. Serial No. 538,528

19 Claims. (Cl. 90—33)

This invention relates to a broaching machine in which two broaching members are provided, operative alternately by hydraulic mechanism.

It is an important object of my invention to provide hydraulic mechanism by which the return stroke of one broaching member may be made at relatively high speed, with the broach remaining at rest during the completion of the operative stroke of the other broaching head.

A further object of the invention is to provide a hydraulic drive for a quick-return broaching machine, so designed that the constant discharge of a dual capacity pump may be used to operate the machine at high, low or intermediate speeds, retaining the quick return feature for all three operative speeds.

A preferred form of the invention is shown in the drawings, in which

Fig. 1 is a side elevation, partly in section, of my improved duplex broaching machine;

Fig. 2 is a plan view of the broaching machine;

Figure 8:
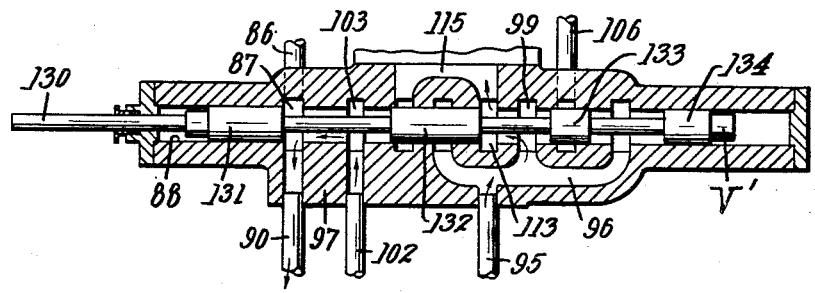
Figure 9:
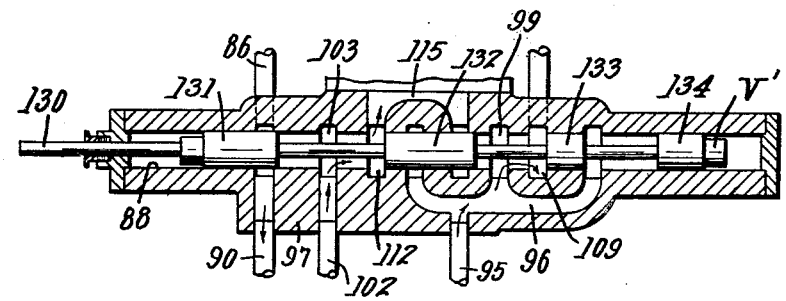
Figure 10:
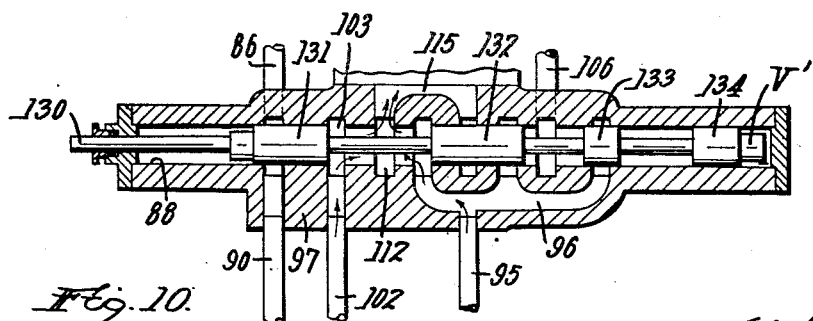

Figs. 3 and 4 are detail sectional end elevations, taken along the lines 3—3 and 4—4 in Fig. 1 respectively;

Fig. 5 is a sectional side elevation of the speed control valve mechanism;

Figs. 6 and 7 are detail sectional elevations, taken along the lines 6—6 and 7—7 in Fig. 5;

Figs. 8, 9 and 10 are sectional side elevations similar to Fig. 5 but showing the parts in different operative positions;

Fig. 11 is a sectional side elevation of one of the broaching heads and operating mechanism, taken along the line 11—11 in Fig. 2;

Figs. 12 and 13 are detail sectional plan views, taken along the lines 12—12 and 13—13 in Fig. 11;

Fig. 14 is a sectional plan view, partly diagrammatic, showing the operative relation of different parts of the hydraulic mechanism;

Figs. 15 and 16 are views similar to Fig. 14 but showing the parts in different positions, and Fig. 17 is a sectional side elevation of the reversing valve mechanism shown in neutral position.

Referring to the drawings, I have shown a duplex broaching machine comprising a bed or frame 20 having guideways 21 (Fig. 2) for a pair of broaching heads A and B. Broaches C are detachably secured to the heads A and B and are slidable through apertures in an end plate 22 against which the work may be positioned.

As is usual in broaching machines, the working stroke of the broach is a draw stroke toward the actuating mechanism, or in the direction of the arrow $a$ in Fig. 2, while the idle or return stroke is away from the actuating mechanism and in the direction of the arrow $b$ in Fig. 2.

Reversing mechanism

Cam plates 24 and 25 are mounted on the heads A and B respectively and engage a cam roll 26 (Fig. 4) mounted at the lower end of an arm 27 clamped to a reversing rod 28. The rod 28 is connected by an arm 29 (Figs. 1 and 3), lever 30 and link 31 (Fig. 2) to a reversing valve to be described.

The cam plates 24 and 25 and cam roll 26 are so positioned that the reversing valve will be shifted as each broaching head approaches the end of its working stroke. The arm 27 may be adjusted along the reversing shaft 28 for different lengths of working stroke. A handle 33 on the shaft 28 may be used for manual reversal of the machine.

Broach operating mechanism

The broaching head A is connected by a piston rod 40 (Fig. 11) to a piston 41 in a cylinder 42. The piston rod 40 is formed with an axial recess 43 therein which extends forward from the rear end thereof for the greater portion of its length.

A tubular member 44 is fixed in the rear cylinder head 45 and extends into the axial passage 43 through a suitable annular packing 46. The tubular member 44 is provided with a port 48 in its side wall and near its front end, which port is uncovered and provides a connection to the cylinder 42 when the piston 41 reaches the extreme end of its outward or return stroke.

The rear broaching head B is similarly mounted on a piston rod 50 (Fig. 14), connected to a piston 51 slidable in a rear cylinder 52 and similarly provided with an axial recess 53 in which a tubular member 54 is slidable. The member 54 is similarly supported on the rear cylinder head 45 and is provided with a port 58 connecting with the cylinder 52 when the broaching head B has completed its return movement to initial or loading position.

The tubular members 44 and 54 are connected to each other through a cross passage 60 (Fig. 14) formed in the rear cylinder head 45. Branch passages 61 and 62 (Fig. 13) connect the cylinders 42 and 52 to the cross passage 60. Check valves 63 and 64 are provided for the branch passages 61 and 62, which check valves open outward into the cross passage 60 and are yieldingly seated by compression springs 65.

A reservoir or storage tank T (Figs. 11 and 12)

is mounted above the broaching cylinders and is connected by ports 67 and 68 (Fig. 12) to cross passages 70 and 71, in which double-ended fluid distributing check valves 72 and 73, controlled by fluid pressure, are slidably mounted. The front end of the cross passage 71 is connected through a passage or pipe 75 (Fig. 11) to the rear and outer end of the cylinder 42, and the front end of the cross passage 70 is connected by a passage or pipe 76 to the front end of the cylinder 42. Similarly, the back end of the cross passage 71 is connected by a passage 77 (Fig. 14) to the rear end of the back cylinder 52, and the back end of the cross passage 70 is connected to a passage 78 to the front end of the back cylinder 52.

The front end of the cylinder 42 is also connected by a pipe 80 (Fig. 14) to an annular port 81 in the side wall of a reversing valve cylinder 82, and the front end of the cylinder 52 is connected by a pipe 83 to another annular port 84 in the side wall of the cylinder 82.

The cylinder 82 also has an annular exhaust port 85 connected by an exhaust pipe 86 (Fig. 1) to an annular exhaust port 87 (Fig. 6) surrounding the cylinder 88 of a speed control valve mechanism to be described. The port 87 is connected by a pipe 90 (Fig. 5) to the return or intake 91 (Fig. 1) of the pump P by which liquid under pressure is supplied for operating the machine.

*Pumping mechanism*

The pump P is shown diagrammatically in Fig. 1 as being a dual capacity type of pump having a smaller rotor 92 and a larger rotor 93, both mounted on a shaft 94 continuously rotated at constant speed by a motor M.

The smaller rotor 92 is connected by a pipe 95 (Fig. 5) to a passage 96 in the casing 97 of the speed control valve cylinder 88. The passage 96 is connected to three annular ports 98, 99 and 100 surrounding the cylinder 88.

The larger rotor 93 (Fig. 1) is connected by a pipe 102 to an annular port 103 also surrounding the cylinder 88. The right hand end of the reversing valve cylinder 82, as viewed in Fig. 14, is provided with an annular port 105 connected by an exhaust pipe 106 (Fig. 7) to an exhaust passage 108 which extends to the exhaust pipe 86 previously described and which is thus connected through the port 87 and pipe 90 (Fig. 6) to the return of the pump P.

An additional annular exhaust port 109 of the cylinder 88 (Figs. 5 and 7) is connected by a short passage 110 to the exhaust connection 108 previously described and thence to the return pipe 90. Spaced annular ports 112 and 113 of the cylinder 88 (Fig. 5) are connected to a supply passage 115 which extends upward into the reversing valve mechanism, as indicated in Fig. 14, and which is connected to annular ports 116 and 117 surrounding the reversing valve cylinder 82.

*Valve mechanism*

A connecting rod 120 (Fig. 14) extends into the reversing valve cylinder 82 and is provided with spaced piston portions 121, 122 and 123, collectively constituting a reversing piston valve V. The piston rod 120 (Fig. 2) is connected by the link 31 previously described to the reversing shaft 28. The valve V is thereby reversed in position as each successive working stroke of the machine is completed.

A connecting rod 130 (Fig. 5) extends into the speed control cylinder 88 and is provided with spaced piston portions 131, 132, 133 and 134, collectively constituting a speed control valve V'. The piston rod 130 is connected by a link 136 (Fig. 1) to a control lever 137 pivoted at 138 and having a handle 139 movable over an index scale 140. The speed control valve V' may thus be moved to high, intermediate, low and neutral positions in accordance with operating conditions.

*Speed control*

The four positions of the speed control valve V' are shown in Figs. 5, 8, 9 and 10. In Fig. 5 the valve V' is in extreme left hand or neutral position, with the larger pump rotor 93 connected through the pipe 102 and ports 103 and 87 to the return pipe 90, while the smaller rotor 92 is connected through the pipe 95, passage 96 and ports 98 and 109 to the exhaust passage 108 (Fig. 7) and thence to the return pipe 90.

Oil delivered from both the large and small rotors is thus returned directly to the pump and no oil is delivered to the supply passage 115 leading through the reversing valve mechanism to the broaching cylinders.

The position of the control valve for low speed operation is indicated in Fig. 8, with the larger rotor 93 connected through the pipe 102 and ports 103 and 87 to the return pipe 90, as in Fig. 5, but with the smaller rotor 92 connected through the pipe 95, passage 96 and ports 99 and 113 to the supply passage 115. The second exhaust port 109 is closed by the piston portion 133. Liquid is thus delivered to one of the broaching cylinders by the smaller rotor 92 through the supply passage 115, and the broaching machine is operated at low speed by the output of the smaller rotor.

The connections for operation of the broaching mechanism at intermediate speed are shown in Fig. 9, with the larger rotor 93 connected through the pipe 102 and ports 103 and 112 to the supply passage 115, and with the smaller rotor 92 connected through the pipe 95, passage 96 and ports 99 and 109 to the return. The broaching mechanism is thus operated at intermediate speed by the output of the larger rotor 93.

In Fig. 10 I have shown the position of the control valve for high speed operation, utilizing the combined output of both the large and the small rotors. The larger rotor 93 is connected through the pipe 102 and ports 103 and 112 to the supply passage 115, as for intermediate speed operation, and the smaller rotor is connected through the pipe 95, passage 96 and ports 100 and 112 to the supply passage 15, while both connections to the return are blocked off. The entire output of the two rotors is thus delivered to one of the broaching cylinders, causing operation thereof at relatively high speed.

The speed control valve V' may be set in any one of its operating positions manually by the operator, or he may bring the machine to rest at any point in its operation by moving the control valve to neutral position, in which position the output of both rotors is by-passed direct to the return.

*Reversing operation*

The three positions of the reversing valve V are shown in Figs. 14, 16 and 17 respectively. When the reversing valve V is in the right hand position shown in Fig. 14, the supply passage 115 is connected through the ports 116 and 81 to the pipe 80, which conducts the liquid direct to the front or left hand end of the front cylinder 42, thus producing an operative stroke of the front broaching head A. At the same time, the front end of the rear broaching cylinder 52 is connected through the pipe 83 and ports 84 and 105 to the pipe 106, which is connected at all times to the return pipe 90 through the connections previously described.

When the reversing valve V is moved to its extreme left hand position, as indicated in Fig. 16, the supply passage 115 is connected through the ports 117 and 84 to the pipe 83, which in turn connects to the front end of the broaching cylinder 52, while the pipe 80 from the front end of the front broaching cylinder 42 is connected through the ports 81 and 85 to the pipe 86, which connects to the return pipe 90 through connections previously described.

If the reversing valve V is moved to mid-position, as indicated in Fig. 17, the supply passage 115 is connected through the ports 116 and 85 to the exhaust pipe 86 and through the ports 117 and 84 to the exhaust pipe 106. In this position the pipes 80 and 83 connect the front ends of the front and rear cylinders 42 and 52 to the supply passage 115 but the pressures are equal in the pipes 80 and 83 and furthermore no substantial pressure can be built up therein, as both pipes 80 and 83 are freely connected to the exhaust pipes 86 and 106.

*Broaching operation*

I will now describe the operation of the mechanism during a broaching operation by the front broaching head A and cylinder 42, as illustrated in Figs. 14 and 15. Oil under pressure will be supplied to the passage 115 by the pump P through the speed control valve mechanism and connections previously described.

At the beginning of the broaching stroke, this oil under pressure will be supplied through the ports 116 and 81 and pipe 80 to the left hand or front end of the front broaching cylinder 42, causing the piston 41 to move rearward or to the right. At the same time, oil under pressure flows through the passage 76 to the front end of the cross passage 70, exerting pressure on the check valve 72 and moving the valve 72 to the rearward position indicated in Fig. 14.

As the piston 41 continues its movement to the right, a substantial portion of the oil in the recess 43 in the piston rod must be ejected through the tubular member 44 which telescopes therewith.

As soon as the cutting stroke begins, the port 48 in the tubular member 44 is closed and the only escape for this liquid is through the member 44 and cross passage 60 to the interior of the rear tubular member 54, which extends into the recess 53 in the rear piston rod 50. Delivery of oil under pressure causes a return movement of the rear piston rod and broaching head to the left in Fig. 14.

At the same time, the oil or liquid in the rear portion of the cylinder 42 is being placed under pressure by the rearward movement of the piston 41 and this oil at first flows through the pipe 75 to the front end of the cross passage 71, building up pressure therein and moving the check valve 73 to the rear. After thus closing the check valve 73, the oil in the cylinder 42 can only escape by opening the check valve 63 and flowing through the cross passage 60, along with the oil from the recess 43 in the piston rod 40.

Consequently a much increased volume of oil is forced through the passage 60 and tubular member 54 to the interior of the rear piston rod 50, and the broaching head B is thus moved very rapidly to the left on its return stroke to initial or loading position.

In one embodiment of my invention, the return stroke takes place at nine times the speed of the working stroke and consequently is completed by the time the operative broaching piston has covered one-ninth of its working stroke.

During the return movement of the broaching head B and piston 51, the oil in front of the piston 51 in the cylinder 52 is necessarily ejected. A portion of this oil flows through the pipe 83 and ports 84 and 105 of the reversing valve mechanism to the exhaust pipe 106 and thence through the return pipe 90 to the pump P to make up for the oil delivered by the pump to the front broaching cylinder.

The back piston 51, however, is moving much more rapidly than the front or working piston 41 and hence more oil is ejected from the front end of the cylinder 52 than is necessary to supply the pump P. This surplus oil passes through the pipe 78, cross passage 70 and ports 67 to the reservoir or tank T.

In order to avoid creating a vacuum behind the back piston 51 as it is moved rapidly forward, oil is drawn from the tank T through the port 68, cross passage 71 and pipe 77 to keep the rear portion of the cylinder 52 filled with oil.

The tank T thus constitutes a storage reservoir to which surplus oil may be delivered and from which make-up oil may be drawn as needed either by the cylinders or the pump.

After the back piston 51 has reached the end of its return stroke, no more oil can be delivered from the cylinder 52 to the pump P, and the pump P thereafter draws oil from the tank T through the port 67, cross passage 70 and pipe 78 to make up for the oil delivered to the front cylinder 42.

When the idle broach has fully completed its return movement, as indicated in Fig. 16, the port 58 is uncovered by the rear piston 51, allowing the excess oil delivered through the cross passage 60 to flow into the rear cylinder 52.

This causes a reversal in the direction of flow of the oil in the rear cylinder 52 and pipe 77 and the oil ejected from the front cylinder during its continued rearward or working stroke is thereafter delivered through the cross passage 60, tubular member 54, port 58, cylinder 52, pipe 77, cross passage 71 and port 68 to the tank T.

During this time the pressure on the oil in the cylinder 42 is applied directly through the pipe 75 to the front end of the cross passage 71, thus maintaining the check valve 73 in rearward position.

When the working stroke of the broaching head A is completed, the reversing valve V is shifted to the position shown in Fig. 16, delivering oil under pressure through the pipe 83 to the front end of the back cylinder 52 and also delivering oil through the pipe 78 to the rear end of the cross passage 70, moving the check valve 72 to its forward position.

At the same time, the oil in the right hand or rear portion of the cylinder 52 is forced through the pipe 77 to the rear end of the cross passage 71, similarly shifting the check valve 73 to forward position.

The hydraulic mechanism then operates exactly as previously described during the working stroke of the rear broaching head B. The front broaching head A is returned at high speed to loading position and thereafter remains at rest while the broaching head B completes its working stroke.

The operation above described takes place without change in any one of the three operative settings of the speed control valve, which merely vary the rate at which oil is delivered to the supply passage 115.

Summary

Having thus described my improved broaching machine and the operation thereof, it will be seen that the machine possesses the very important advantage of causing its inoperative broaching head to return at high speed and to thereafter remain at rest for the greater portion of the working stroke of the other broaching head, during which period the finished work may be removed and a new piece of work may be inserted in the machine. A very substantial part of the operator's time is thus saved and the production of the machine is correspondingly increased.

Furthermore, all of the relative motions and speed changes take place automatically under the control of the hydraulic mechanism and the entire operation of the machine is performed smoothly and without shock and without substantial speed variations.

Having thus described my invention and the advantages thereof, I do not wish to be limited to the details herein disclosed, otherwise than as set forth in the claims, but what I claim is:—

1. A duplex broaching machine comprising a pair of broaching heads, and actuating mechanism for said broaching machine, including means effective to give said broaching members alternate operative movements and means effective to return the inoperative broaching head at a different and substantially higher speed to initial loading position during the first part only of the working stroke of the operative broaching head, said inoperative broaching head remaining at rest during the completion of the working stroke of the operative broaching head.

2. A duplex broaching machine comprising a pair of broaching heads, actuating mechanism for said broaching machine, including means effective to give said broaching members alternate operative movements and means effective to return the inoperative broaching head at a substantially higher speed to initial loading position during the first part only of the working stroke of the operative broaching head, said inoperative broaching head remaining at rest during the completion of the working stroke of the operative broaching head, and automatic means to reverse the connections between said actuating mechanism and said broaching heads when a working stroke is completed whereby a broaching operation by the previously inoperative broaching head is automatically initiated.

3. A duplex broaching machine comprising a pair of broaching heads, a separate cylinder and piston connected to operate each broaching head, and hydraulic mechanism connected to said cylinders, said mechanism including means effective to actuate a selected broaching head at predetermined speed on its working stroke and means to simultaneously return the inoperative broaching head at a substantially higher speed to initial loading position.

4. A duplex broaching machine comprising a pair of broaching heads, a separate cylinder and piston connected to operate each broaching head, and hydraulic mechanism connected to said cylinders, said mechanism including means effective to actuate a selected broaching head at predetermined speed on its working stroke, to simultaneously return the inoperative broaching head at a substantially higher speed to initial loading position, and supplemental hydraulic connections enabling said inoperative broaching head to remain at rest while said working stroke is being completed.

5. The combination in a duplex broaching machine as set forth in claim 4, in which a storage tank is provided to which liquid is delivered from in front of the inoperative piston during the quick return movement thereof and from which make-up liquid is drawn to supply the hydraulic actuating mechanism during the completion of the working stroke and after the inoperative broaching head has come to rest.

6. A duplex broaching machine comprising a pair of broaching heads, a separate cylinder and piston connected to operate each broaching head, hydraulic mechanism connected to said cylinders, said mechanism including means effective to actuate a selected broaching head at predetermined speed on its working stroke and means to simultaneously return the inoperative broaching head at a substantially higher speed to initial loading position, said inoperative broaching head completing its return stroke substantially before the operative broaching head completes its working stroke and thereafter remaining at rest until said working stroke is completed, a storage tank, connections between said tank and said cylinders for delivering liquid from in front of each piston to the storage tank during the quick return movement of said respective piston on its inoperative stroke, said connections also delivering make-up liquid from the tank to supply the hydraulic actuating mechanism during the completion of the working stroke of the operative broaching head after the inoperative broaching head has come to rest, pressure-operated fluid-distributing valves controlling said connections and effective to reverse the connections to the storage tank as the working stroke of one broaching head is completed and the working stroke of the other broaching head commences.

7. A duplex broaching machine comprising a pair of broaching heads, a separate cylinder and piston connected to operate each broaching head, hydraulic mechanism connected to said cylinders, said mechanism including means effective to actuate a selected broaching head at predetermined speed on its working stroke and means to simultaneously return the inoperative broaching head at a substantially higher speed to initial loading position, said inoperative broaching head completing its return stroke substantially before the operative broaching head completes its working stroke and thereafter remaining at rest until said working stroke is completed, and automatic means to reverse the hydraulic connections to said cylinders when said working stroke is completed.

8. A duplex broaching machine comprising a pair of broaching heads, a separate cylinder and piston connected to operate each broaching head, and hydraulic mechanism connected to said cylinders, said mechanism including means effective to give said broaching heads alternate operative movements, each piston being mounted on a tubular piston rod and having a tubular member telescoping therewith and fixed in one end of its associated cylinder.

9. A duplex broaching machine comprising a pair of broaching heads, a separate cylinder and piston connected to operate each broaching head, and hydraulic mechanism connected to said cylinders and effective to actuate said broaching heads, each piston being mounted on a tubular piston rod and having a tubular member telescoping therewith and fixed in one end of its associated cylinder, the interiors of said fixed tubular members in said two cylinders being connected together by a cross passage.

10. A duplex broaching machine comprising a pair of broaching heads, a separate cylinder and piston connected to operate each broaching head, and hydraulic mechanism connected to said cylinders and effective to actuate said broaching heads, each piston being mounted on a tubular piston rod and having a tubular member telescoping therewith and fixed in one end of its associated cylinder, the interiors of said fixed tubular members in said two cylinders being connected together by a cross passage and each being additionally connected to its associated cylinder by a passage having a check valve opening toward the interior of said tubular member.

11. A duplex broaching machine comprising a pair of broaching heads, a cylinder and piston connected to operate each broaching head, and hydraulic mechanism connected to said cylinders and effective to actuate said broaching heads, each piston being mounted on a tubular piston rod and having an open-ended tubular member telescoping therewith and fixed at the rear end of its associated cylinder, the interiors of said fixed tubular members in said two cylinders being connected together by a cross passage, and each fixed tubular member having a port near its open end which is uncovered and opened to its associated cylinder when the piston in said cylinder approaches its extreme forward position.

12. A duplex hydraulic broaching machine comprising a pair of broaching heads, a separate cylinder and piston connected to operate each head, and hydraulic actuating mechanism therefor including a dual capacity pump, manually operated means to connect either or both parts of said pump to said hydraulic actuating mechanism to operate said broaching heads at high, low or intermediate speeds during their working strokes, and means to return an inoperative broaching head to initial loading position at a speed substantially higher than the speed of the corresponding working stroke but in predetermined proportion thereto.

13. A duplex hydraulic broaching machine comprising a pair of broaching heads, a separate cylinder and piston connected to operate each head, and hydraulic actuating mechanism therefor including a dual capacity pump, manually operated means to connect either or both parts of said pump to said hydraulic actuating mechanism to operate said broaching heads at high, low or intermediate speeds during their working strokes, and means to return an inoperative broaching head to initial loading position at a speed substantially higher than the speed of the corresponding working stroke, the return speed being in the same ratio to the working speed for all working speeds.

14. A duplex hydraulic broaching machine comprising a pair of broaching heads, a separate cylinder and piston connected to operate each head, and hydraulic actuating mechanism therefor including a dual capacity pump, manually operated means to connect either or both parts of said pump to said hydraulic actuating mechanism to operate said broaching heads at high, low or intermediate speeds during their working strokes, means to return an inoperative broaching head to initial loading position at a speed substantially higher than the speed of the corresponding working stroke, but in fixed ratio thereto, and means to automatically reverse the direction of operation of said broaching heads at the end of each working stroke of the respective broaching head.

15. A duplex hydraulic broaching machine comprising a pair of broaching heads, a separate cylinder and piston connected to operate each head, and hydraulic actuating mechanism therefor, including means effective to operate said broaching heads alternately at selected working speeds, and means effective to return the inoperative broaching head at a speed several times more rapid than its corresponding working stroke, said speed ratio being definitely established and being independent of working speed.

16. A duplex hydraulic broaching machine comprising a pair of broaching heads, a separate cylinder and piston connected to operate each broaching head, a supply of liquid under pressure, a storage tank, means to connect the front end of each cylinder to said liquid supply and to said storage tank, means to connect the back end of each cylinder to said storage tank, pressure-operated fluid distributing valves controlling the flow through said tank connections, and means to apply pressure to shift said valves as a broaching head approaches the end of its working stroke.

17. A duplex hydraulic broaching machine comprising a pair of broaching heads, a separate cylinder and piston connected to operate each head, a supply of liquid under pressure, a storage tank, means to connect the front end of each cylinder to said liquid supply and to said storage tank, means to connect the back end of each cylinder to said storage tank, pressure-operated fluid distributing valves controlling the flow through said tank connections, and means to apply pressure to shift said valves as a broaching head approaches the end of its working stroke, said valves being double-acting and being both reversed in position at the end of each working stroke of a broaching head.

18. A duplex hydraulic broaching machine comprising a pair of broaching heads, a separate cylinder and piston connected to operate each head, hydraulic actuating mechanism therefor, a passage to which said cylinders are connected, and a fluid-distributing valve for each cylinder opening toward said passage, said valves being controlled by fluid pressure within the respective cylinders and being effective to allow a flow of fluid from either cylinder to said passage.

19. A duplex hydraulic broaching machine comprising a pair of broaching heads, a separate cylinder and piston connected to operate each head, and hydraulic actuating mechanism therefor, the front end of each cylinder being connected to the rear end of the other cylinder by passages having pressure-operated fluid-distributing valves therein effective to close the passage from the working end of each cylinder during its working stroke.

DONALD H. WEST.